Patented Nov. 18, 1952

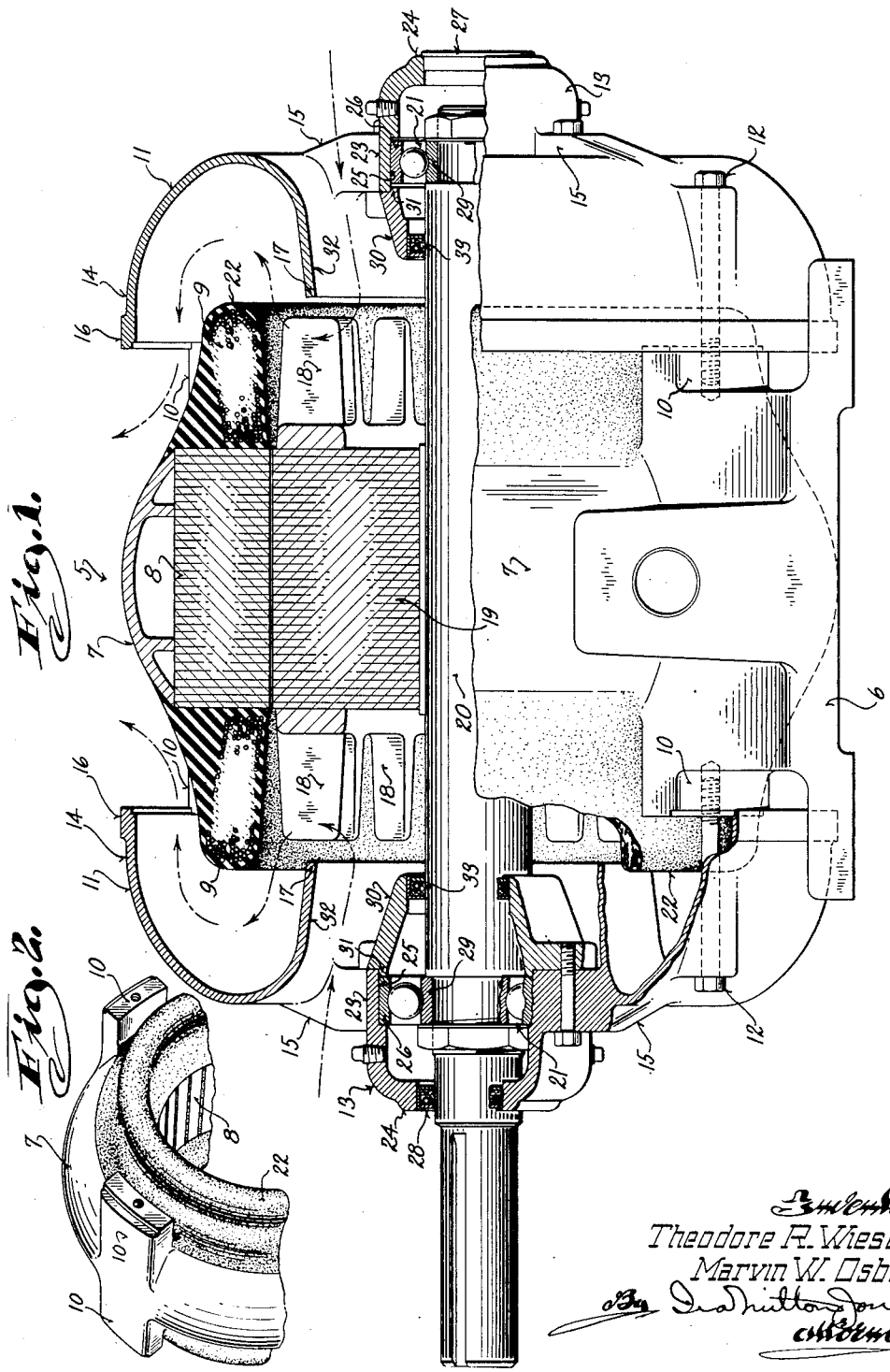

2,618,757

UNITED STATES PATENT OFFICE 2,618,757

ELECTRIC MOTOR SUITABLE FOR USE IN DIRTY AND DUSTY ATMOSPHERE

Theodore R. Wieseman and Marvin W. Osborn, Milwaukee, Wis., assignors to The Louis Allis Company, Milwaukee, Wis., a corporation of Wisconsin Application May 21, 1951, Serial No. 227,364

3 Claims. (Cl. 310—88)

1

This invention relates to electric motors of the so-called self-cleaning type like that illustrated in the patent to J. L. Brown, No. 2,202,622 issued May 28, 1940.

Such motors were developed to cope with the lint laden atmosphere prevalent in textile mills, and are characterized by large unobstructed air passages through which the cooling air may flow without danger of having foreign matter carried along by the air become entrapped in and clog the air passages.

The success of these self-cleaning motors in the textile field suggested their possible use in cement mills and similar situations where the atmosphere is extremely dirty and dusty, but it was found that the abrasive cement dust was more than the textile motor could handle. It is the purpose of this invention, therefore, to improve the self-cleaning motor of the type represented by the aforesaid patent to Brown and by such improvement adapt it for use in cement mills and other similar environments where the air is exceptionally dirty and contains a high percentage of abrasive material.

To this end the present invention has as its object to provide an electric motor in which the component parts are so shaped and positioned with respect to one another as to assure a free unobstructed air passage into each end bell through the air impelling fans and around the protruding ends of the stator windings through which the cooling air may be drawn without danger of having the abrasive dust particles carried along with the air entering the bearings or come in contact with the stator windings.

Another object of this invention is to provide an improved plastic covering for the protruding ends of the stator windings which is capable of withstanding the abrasive impact characteristic of the atmosphere prevalent in cement mills to thus assure against having the foreign matter carried along with the air open up cracks in the plastice covering and reach the windings.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best

2 mode so far devised for the practical application of the principles thereof, and in which:

Figure 1 is a view partially in side elevation and partially in longitudinal section through an electric motor embodying this invention; and Figure 2 is a fragmentary perspective view of a portion of the stator to better illustrate a detail of its construction.

Referring now particularly to the accompanying drawing, the numeral 5 designates the frame of the motor which is mounted upon a base 6 and has an annulus 7 larger in diameter at its center than at its ends. Within this frame is the customary stator core 8 and stator windings 9 which protrude from the ends of the core and annulus 7.

At circumferentially spaced points around the annulus 7 are oppositely axially projecting bosses 10 which overlie the protruding end portions of the windings, and have end bells 11 secured thereto as by bolts 12.

The end bells 11 are substantially identical in construction and each has a central hub 13 and an annular rim portion 14 spaced radially from the hub but connected thereto by spokes 15. Each end bell thus has a relatively large air inlet opening leading axially into the motor around its hub 13. The annular rim portions 14 are concavely curved in longitudinal section and substantially embrace the protruding ends of the windings 9. This disposes the outer peripheral edge 16 of the rim radially outward from the windings as shown and the inner edge 17 opposite air impeller blades 18 which revolve with the rotor 19 of the motor.

The rotor 19 is, of course, mounted upon a shaft 20 which is journalled in bearings 21 in the hubs 13 of the end bells. Thus it will be seen that as the rotor revolves its air impeller blades 18 draw air into the inlet openings in the end bells and cause the same to flow outwardly around the protruding ends of the windings.

To protect the windings their protruding portions are ensheathed in plastic material 22 applied to the windings and so formed and shaped that their outer surfaces merge nicely with the inner surfaces of the stator core 8 and the outer surfaces of the stator frame annulus 7. While it is appreciated that the protruding end portions of stator windings have been equipped with protective coatings and coverings heretofore, as far as is known none of these protective coatings heretofore available was capable of withstanding the highly abrasive atmosphere of cement mills. To meet this condition the bodies or coverings 22 of the present invention are formed of a compound which is basically a mixture of an air drying insulating varnish and short asbestos fiber. It is applied in one coat and shaped as desired and then baked at low temperature to assure thorough curing. The proportions of the ingredients of this compound are in the ratio of one pound of asbestos fiber to thirty-six (36) fluid ounces of varnish. The specifications for the compound are as follows:

Asbestos fiber

Average fiber length, $\frac{1}{16}''$ approx.
Maximum fiber length, $\frac{1}{4}''$ approx.
Analysis:

| | Per cent |
|---|---|
| $SiO_2$ | 41.8 |
| $Fe_2O_3$ | 2.1 |
| MgO | 41.9 |
| Other oxides | .1 |
| Water | 14.1 |
| | 100.0 |

Air drying varnish

This varnish is an alkyd resin type and is a glycerol phthalate, linseed oil, urea combination, thinned with xylol and should meet the following specifications:

1. Viscosity _____ 32–35 sec. @ 25° C. (#3 Zahn cup)
2. Color _____ Clear (natural)
3. Per cent solids___ 40–45% (ASTM D115-46T)

After being baked the protective bodies covering the protruding end portions of the windings are sprayed with a heavy glass-like enamel to give the same a smooth surface.

The hubs 13 of the end bells have cylindrical walls 23 which merge with end walls 24 and are bored as at 25 to receive the outer races 26 of the ball bearings which mount the rotor shaft. The end walls 24 constitute the axially outermost portions of the end bells and are bored to permit the shaft to pass therethrough. Where the shaft protrudes from only one end of the motor as shown in Figure 1, this bore in the end wall 24 of one of the end bells is closed by a cap 27, while the bore in the end wall 24 of the other end bell is equipped with a tight fitting shaft seal 28.

The inner races 29 of the bearings are secured to the rotor shaft by lock nuts so that in assembly, the bearings are first mounted upon the shaft and then the end bells are applied with the outer races of the bearings entering and seating in the bores 25 where they are held by inner end caps 30. These inner end caps 30 are, of course, applied to the shaft before the bearings and when brought into position are removably bolted to the inner ends of the hub portions. Secured in this manner flanges 31 on the end caps overlie the outer races 26 of the bearings and confine the same in place.

In the case of one of the bearings the outer race is clamped between the bottom of the bore 25 and the adjacent flange 31 but the outer race of the other bearing has a degree of end play as shown to preclude binding of the parts as will be readily apparent.

Attention is directed to the fact that the end caps 30 are taperingly reduced in diameter and thus coact with the adjacent walls 32 of the annular rim portions of the end bells to direct the air toward the impeller blades.

The bores in the end caps 30 also have tight fitting shaft seals 33 so that the hubs may be packed with lubricant without danger of interference therewith from the abrasive laden dust filled atmosphere in which the motor is called upon to operate when in service in a cement mill for instance.

From the foregoing description taken in connection with the accompanying drawing it will be readily apparent that this invention provides an electric motor especially adapted for use in cement mills and similar environments where the atmosphere contains a large percentage of abrasive dust.

What we claim as our invention is:

1. An electric motor comprising: a stator frame having an annulus substantially larger in external diameter at its center than at its ends and having circumferentially spaced bosses extending axially in opposite directions from the large diameter central portion of the annulus and beyond the ends thereof; a stator core and windings in said frame, the windings protruding axially a substantial distance from the ends of the annulus; smooth surfaced plastic bodies formed about and covering the protruding portions of the windings and being independently form retaining, the surfaces of said plastic bodies merging smoothly with the adjacent inner surfaces of the stator core and the outer surfaces of the annulus; end bells coaxial with but spaced a substantial distance from the opposite ends of the annulus and overlying the extremities of the covered windings protruding therefrom; securing means fastening the end bells to said bosses with the end bells lying substantially entirely outwardly of the extremities of the windings, the end bells having outer annular rim portions and central hub portions radially spaced from one another but connected by spokes to provide large air inlet passages surrounding the hub portions, the rim portions being concavely curved in longitudinal section and opening toward the annulus, and having concentric radially spaced walls projecting axially inwardly toward the extremities of the covered windings and terminating closely adjacent thereto so that the protruding portions of the covered windings are exposed at the exterior of the motor for substantially their entire length, said concentric walls substantially embracing the extremities of the windings with a radial space between said extremities of the covered windings and the concentric walls at least equal to the radial thickness of the covered protruding windings so as to coact therewith in defining unrestricted air passages around the extremities of the covered windings; the hub portions of the end bells being hollow and having cylindrical walls merging with end walls which provide the axially outermost extremities of the end bells; bearings in said hub portions; a rotor having a shaft journalled in said bearings and having fan blades operating within the protruding stator windings at each end of the motor, said fan blades being axially opposite the inner of said concentric walls of the end bells and extending axially along substantially the entire length of the protruding windings in close proximity thereto; and inner bearing caps closing the inner ends of the hub portions, said inner bearing caps being taperingly reduced in diameter from the hub portions toward the rotor to coact with the adjacent inner concentric walls of the end bells in guiding air entering the end bells through their air inlet openings into the fans.

2. The electric motor set forth in claim 1 further characterized by the fact that the rotor bearings are ball bearings and that the hub portions of the end bells are bored from their inner ends to receive the outer races of the ball bearings; and further characterized by the fact that said inner bearing caps have portions overlying the outer races of the bearings to hold the same in place.

3. In an electric motor: a stator frame having an annulus substantially larger in external diameter at its center than at its ends and having circumferentially spaced bosses extending axially a substantial distance in opposite directions therefrom; a stator core and windings in said frame, the windings protruding axially a substantial distance from the ends of the annulus; end bells at the opposite ends of the motor coaxial with the annulus but lying substantially entirely outwardly of the extremities of the windings; securing means fastening the end bells to said bosses, said end bells having central hub portions and annular rim portions spaced radially from one another but connected by spokes so as to provide large inlet openings between the spokes, the annular rim portions of the end bells being arcuate in longitudinal section and having radially spaced concentric inner and outer walls extending toward the extremities of the windings and substantially embracing the same, the bottoms of said arcuate rim portions being spaced a substantial distance outwardly of and in line with the extremities of the windings, and both the inner and outer concentric walls terminating closely adjacent to the extremities of the windings but being spaced a distance radially therefrom at least equal to the radial thickness of the windings so that the protruding portions of the windings are exposed at the exterior of the motor for substantially their entire length; plastic bodies formed about and covering the protruding ends of the windings, said plastic bodies having smooth inner surfaces equal in diameter to that of the bore of the stator core so as to merge therewith, and having outer surfaces merging smoothly with the outer surfaces of the ends of the stator frame annulus so that the end portions of the covered windings coact with the arcuate rim portions of the end bells to define unrestricted air passages around the extremities of the windings, whereby air drawn into the air inlet openings in the end bells may flow freely around the covered ends of the windings; said plastic bodies consisting of a mixture of an air drying insulating varnish and short asbestos fiber to thereby afford maximum resistance to abrasion by foreign particles carried along with the air; and a rotatable centrifugal impeller in each end of the motor having its blades inside the adjacent protruding ends of the winding and arranged to extend axially along substantially the entire length of said windings in close proximity thereto, to draw cooling air into the inlet openings of the end bells and forcibly circulate such air through said unrestricted air passages around the extremities of the windings and over the exteriors of the plastic bodies covering the protruding ends of the windings toward the annulus therebetween.

THEODORE R. WIESEMAN.
MARVIN W. OSBORN.

REFERENCES CITED

The following references are of record in the file of this patent:

UNITED STATES PATENTS

| Number | Name | Date |
|---|---|---|
| 1,908,101 | Apple | May 9, 1933 |
| 1,911,341 | Apple | May 30, 1933 |
| 1,921,140 | Smith | Aug. 8, 1933 |
| 2,202,622 | Brown | May 28, 1940 |